United States Patent Office
3,422,122
Patented Jan. 14, 1969

3,422,122
6 HALO-9β,10α-STEROIDS
Engbert Harmen Reerink, Pieter Westerhof, and Hendrik Frederik Louis Scholer, Weesp, Netherlands, assignors to North American Philips Company, Inc., New York, N.Y., a corporation of Delaware
No Drawing. Continuation of application Ser. No. 399,374, Sept. 25, 1964, which is a continuation-in-part of application Ser. No. 201,824, June 12, 1962. This application Oct. 7, 1966, Ser. No. 585,720
Claims priority, application Great Britain, June 29, 1964, 26,744/64
U.S. Cl. 260—397.3                6 Claims
Int. Cl. C07c 169/36

ABSTRACT OF THE DISCLOSURE 6 halo-9β,10α-steroids of the pregnane series. Examples are 6 - fluoro-17α-hydroxy-9β,10α-pregna-4,6-diene-3,20-dione 17-acetate, 3-ethoxy-6-fluoro - 9β,10α - pregna - 3,5-dien-20-one and 6-bromo-9β, 10α-pregna-4,6-diene-3,20-dione. These compounds are progestationally active and in general are uterotropic and antiuterotropic.

---

This application is a continuation of application Ser. No. 399,374, Sept. 25, 1964, now abandoned, which is a continuation-in-part of our copending application Ser. No. 201,824, filed June 12, 1962.

The invention relates to 9β,10α-steroids of the general formula

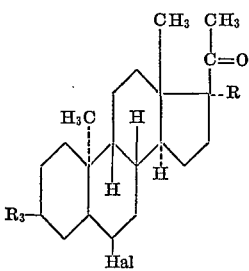

in which formula R₃ represents a 3-keto-4,6-bisdehydro-system, a 3-keto-1,4-bisdehydro-system, a 3-keto-1,4,6-trisdehydro-system, a 3-alkoxy-3,5-bisdehydro-system, Hal represents a fluoro-, chloro- or bromo atom,
R represents a hydrogen atom or esterified hydroxy or etherified hydroxy group.

The compounds according to the invention have in general excellent paraenterally and/or orally progrestational activity and are free or substantially free of androgenic and/or estrogenic activity.

The compounds are in general uterotropic and anti-uterotropic (this latter activity can also be explained as a form of antiestrogenic activity).

The hydrogen atoms or methyl groups at the carbon atoms 8, 9, 10, 13 and 14 of the compounds according to the invention have the same stereochemical configuration as the corresponding hydrogen atoms and methyl groups in dihydroisolumisterone. Castells et al. Proc. of the Chemical Society, 1958, page 7, has shown that dihydroisolumisterone has the configuration 8β,9β,10α-methyl, 13β-methyl, 14α.

The novel steroids of the invention are indicated as 9β,10α-steroids to indicate at which carbon atoms (9 and 10) the stereo-configuration deviates from the one of the normal steroids and in which sense (9β,10α in contradistinction to the 9α,10β-configuration of the normal steroids).

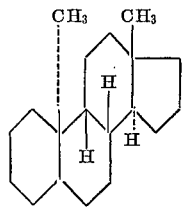

In the above given structural formula the β-position at the carbon atoms 8, 9 and 13 is indicated by a solid line, whereas the α-position at the carbon atoms 10 and 14 is indicated by a broken line. It should be observed that the configuration of the hydrogen atoms or substituents at the other carbon atoms may be either α, β or planar. Whether a hydrogen atom or a substituent at these other carbon atoms is in one of these positions is indicated by the chemical name only and not by the chemical formulae unless explicitly so expressed as in the case of a dotted line which always indicates the α-position.

When R₃ represents an alkoxy-group the alkoxy-group is preferably an aliphatic or mixed aliphatic-aromatic or mixed aliphatic-alicyclic group. As such may be mentioned methoxy-, ethoxy-, propoxy-, tert.-, butoxy-, cyclopentyloxy-, cyclohexyloxy-, and benzyloxy.

In preparing the compounds according to the invention use may be made of starting materials in which the group R₃ represents an esterified hydroxy group. In such a case R₃ is preferably the acyloxy group of an aliphatic mono-carboxylic acid containing from 1–20 carbon atoms, especially those having from 1–6 carbon atoms. As such carboxylic acids may be mentioned formic acids, acetic acid, butyric acid or valeric acid.

When R represents an etherfied hydroxy group then R is preferably an alkyl group containing from 1–10 carbon atoms, which alkyl group is preferably an aliphatic or mixed aliphatic-aromatic group. The same examples of R may be mentioned as in the last but one paragraph, defined in the case of R₃, further cyclopent-1'-enyloxy-, 1'-ethoxy-cyclopentyloxy and tetrahydro pyranyloxy.

When R represents esterfied hydroxy then R is preferably the acyl group of an inorganic acid of an aliphatic mono-, di- or tricarboxylic acid containing from 1–20 carbon atoms or the acyl group of a mixed aliphatic aromatic carboxylic acid. Examples of these OR groups are form-oxy-, acetoxy-, propionoxy-, butyroxy-, the acyloxy-groups of oleic acid, palmitic acid, stearic acid, enanthoic acid, undecyloic acid, caproic acid, pivelic acid, succinic acid, malonic acid, citric acid, benzoic acid and p-hexyloxy-phenyl propionic acid, sulphuric acid or phosphoric acid.

Preferred compounds of the underlying invention are 3-ethoxy-6-chloro-17α-hydroxy-9β,10α-pregna-3,5-dien-20-one 17-acetate (Compound 1);
6-chloro-9β,10α-pregna-4,6-dien-3,20-dione (Compound 2);
6-chloro-17α-hydroxy-9β,10α-pregna-4,6-diene-3,20-dione 17-acetate (Compound 3);
6β-fluoro-9β,10α-pregna-1,4-diene-3,20-dione (Compound 4);
6-fluoro-9β,10α-pregna-4,6-diene-3,20-dione (Compound 5);
6-fluoro-17α-hydroxy-9β,10α-pregna-4,6-diene-3,20-dione 17-acetate (Compound 6);
6-chloro-9β,10α-pregna-1,4,6-triene-3,20-dione (Compound 7);
6-fluoro-9β,10α-pregna-1,4,6-triene-3,20-dione (Compound 8);
6β-chloro-9β,10α-pregna-1,4-diene-3,20-dione (Compound 9);

6-bromo-9β,10α-pregna-4,6-diene-3,20-dione (Compound 10).

The pharmacological properties of the Compounds 1–9 as mentioned in the foregoing paragraph are given in the following table.

TABLE

| | 1 glycocorticoid | 4 anti-inflammatoir | 25 estrogenic | 26 anti-exogen. estrogenic | 26 anti-endogen. estrogenic | 27 uterotropic | 28 A anti-uterotropic | 28 S stimulating estrogens | 29 parenter. progestation | 31 oral progestation | 15 androgenic (rat) | 17 A anti-androg. | 17 S stimulating androgens | 20 anabolic | 21 renotropic | 14 androgenic (mouse) |
|---|---|---|---|---|---|---|---|---|---|---|---|---|---|---|---|---|
| 1 | − | | − | + | − | + | + | − | + | + | − | − | − | − | − | − |
| 2 | − | − | − | − | − | + | + | − | + | + | − | | | − | − | − |
| 3 | − | − | − | + | + | + | + | − | + | + | − | | | − | | |
| 4 | − | − | | + | + | + | − | − | + | | | | | | − | − |
| 5 | − | − | − | + | + | + | + | − | + | + | − | − | − | − | − | − |
| 6 | − | − | − | + | + | + | + | − | + | + | − | − | − | − | − | |
| 7 | | − | − | − | | + | + | − | + | + | − | | | | − | |
| 8 | | | | | | + | + | − | | | | | | | | |
| 9 | − | − | | | | + | + | − | + | + | − | − | | | − | |

Other compounds according to the invention are 6-chloro-17α-hydroxy-9β,10α-pregna-1,4,6-triene-3,20-dione 17-acetate (Compound 11);
6-fluoro-17α-hydroxy-9β,10α-pregna-1,4,6-triene-3,20-dione 17-acetate (Compound 12);
6-bromo-9β,10α-pregna-1,4,6-triene-3,20-dione (Compound 13);
6β-chloro-17α-hydroxy-9β,10α-pregna-1,4-diene-3,20-dione 17-acetate (Compound 14);
6β-fluoro-17α-hydroxy-9β,10α-pregna-1,4-diene-3,20-dione 17-acetate (Compound 15);
6-bromo-17α-hydroxy-9β,10α-pregna-1,4,6-triene-3,20-dione 17-acetate (Compound 16).

6-fluoro-17α-hydroxy-9β,10α-pregna-4,6-diene - 3,20 - dione 17-caproate and the corresponding 17-pivalate, 17-sulphate and 17-phosphate esters.

6-chloro-17α-hydroxy-9β,10α-pregna-4,6-diene - 3,20 - dione 17-caproate and the corresponding 17-pivalate-, 17-sulphate- and 17-phosphate esters.

6-chloro-17α-hydroxy-9β,10α-pregna-1,4,6 - triene - 3, 20-dione 17-caproate and the corresponding 17-formate-, 17-phenylpropionate-, 17-propionate-, 17-palmitate-, and 17-stearate esters.

6-fluoro-17α-hydroxy-9β,10α-pregna-1,4,6 - triene - 3, 20-dione 17-caproate and the corresponding 17-formate, 17-enanthoate-, 17-undecylenate-, 17-butyrate-, and 17-palmitate esters.

6β-chloro-17α-cyclopentyloxy-9β,10α-pregna - 1,4 - diene-3,20-dione and the corresponding 17α-benzyloxy or 17α-tetrahydropyranyloxy-ethers.

6β-fluoro-17α-tertiary butoxy-9β,10α-pregna-1,4-diene-3,20-dione and the corresponding 17α-ethoxy, 17α-methoxy or 17α-hexyloxy-ethers.

3-ethoxy-6-fluoro-17α-hydroxy-9β,10α - pregna - 3,5 - dien-20-one and the corresponding 3-methoxy-, 3-cyclopentyloxy and 3-benzyloxy-ethers.

3-ethoxy-6-chloro-9β,10α-pregna-3,5-dien-20 - one and the corresponding 3-propoxy- or 3-methoxy-ethers.

3-ethoxy-6-fluoro-9β,10α-pregna-3,5-dien-20 - one and the corresponding 3-butoxy-, 3-pentoxy-, 3-cyclohexyloxy-ethers.

The compounds according to the invention may be prepared from 9β,10α-steroids by techniques known per se.

In particular the methods of producing the new 9β,10α-steroids are characterized in that:

(a) A compound of the formula

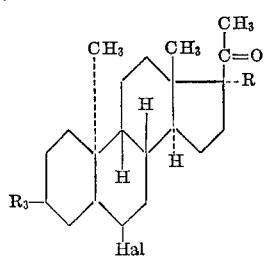

in which formula

R₃ represents a 3-keto-4-dehydro-system, a 3-keto-4,6-bis-dehydro-system,
Hal represents a fluoro-, chloro- or bromo atom,
R represents a hydrogen atom or an esterified hydroxy or etherified hydroxy group, is subjected to microbiological 1-dehydrogenation.

(b) A compound of the formula

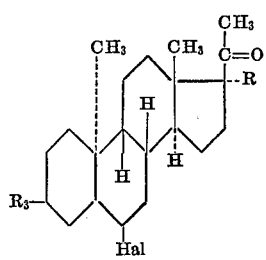

in which formula

R₃ represents a 3-keto-4-dehydro-system, a 3-keto-4,6-bisdehydro-system,
Hal represents a fluoro-, chloro- or bromo atom,
R represent a hydrogen atom or an esterified hydroxy or etherified hydroxy group, is subjected to direct 1,2-dehydrogenation.

(c) A compound of the formula in which formula

R₃ represents a 3-keto-4-dehydro-system, a 3-keto-4,-6-bisdehydro-system,
Hal represents a fluoro-, chloro- or bromo atom,
R represents a hydrogen atom or an esterified hydroxy or etherified hydroxy group, is subjected to selective 1,2-dehydrohalogenation.

(d) A compound of the formula in which formula

R₃ represents a 3-keto-4-dehydro-system, a 3-keto-1,4-bisdehydro-system,
Hal represents a fluoro-, chloro- or bromo atom in β-positions,
R represents a hydrogen atom or an etherified hydroxy or esterified hydroxy group, is subjected to direct 6,7-dehydrogenation.

(e) A compound of the formula

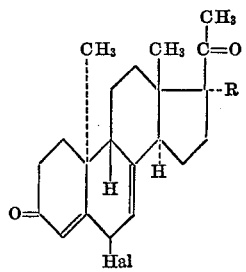

in which formula

Hal represents a fluoro-, chloro- or bromo atom,
R represents a hydrogen atom or an esterfied or etherified hydroxy group, is subjected to acidic isomerisation in a waterfree alkanol containing medium.

(f) A compound of the formula

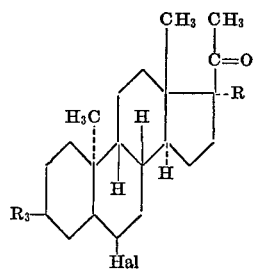

in which formula

R₃ represents a 3-alkoxy-3,5-bisdehydro-system,
Hal represents a fluoro-, chloro- or bromo atom,
R represents a hydrogen atom or an esterified hydroxy or etherified hydroxy group, is subjected to reaction with 2,3-dichloro-5,6-dicyano-benzoquinone.

(g) A compound of the formula

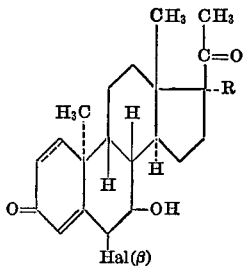

in which formula double bond may be present between carbon atoms 1 and 2,

Hal represents a fluoro-, chloro- or bromo atom in β-positions,
R represents a hydrogen atom or an esterified hydroxy or etherified hydroxy group, is subjected to a dehydration reaction.

(h) A compound of the formula

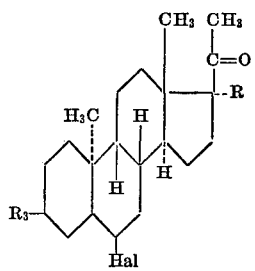

in which formula

R₃ represents a 3-alkoxy-3,5-bisdehydro-system,
Hal represents a fluoro-, chloro- or bromo atom, R represents a hydrogen atom or an esterified hydroxy or etherified hydroxy group, is subjected to oxidation with tertiary butylchromate.

(i) A compound of the formula

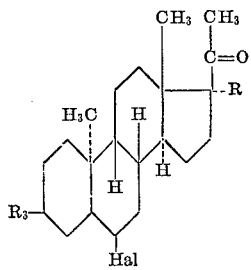

in which formula $R_3$ represents a 3-alkoxy-3,5-bisdehydro-system,
Hal represents a fluoro-, chloro-, or bromo atom
R represents a hydrogen atom or an esterified hydroxy or etherified hydroxy group, is subjected to oxidation with tertiary butylchromate.

(j) A compound of the formula

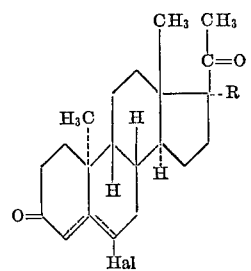

in which formula a double bond is present between the carbon atoms 4 and 5 or 5 and 6, Hal represents a fluoro-, chloro- or bromo atom,
R represents a hydrogen atom or an esterified hydroxy or etherified hydroxy group, is subjected to an enoletherification reaction of the keto oxygen atom at carbon atom 3.

(k) A compound of the formula

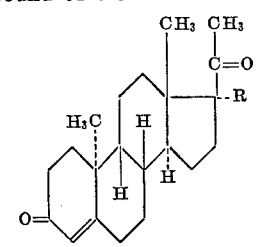

in which formula

R represents a hydrogen atom or an esterified hydroxy or etherified hydroxy group, is subjected to substitution-halogenation at carbon atom 6.

(l) A compound of the formula

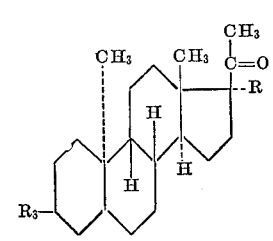

in which formula $R_3$ represents a 3-alkoxy-3,5-bisdehydro-system, a 3-acyloxy-3,5-bisdehydro-system, R represents a hydrogen atom or an esterified hydroxy or etherified hydroxy group, is subjected to a halogenation reaction to introduce halogen at carbon atom 6.

(m) A compound of the formula

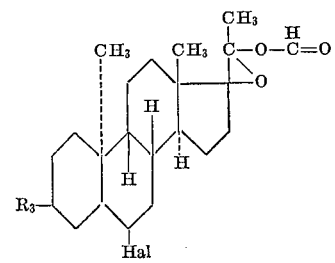

in which formula $R_3$ represents a 3-keto-4,6-bisdehydro-system, a 3-keto-1,4-bisdehydro-system, a 3-keto-1,4,6-trisdehydro-system,
Hal represents a fluoro-, chloro- or bromo atom, is subjected to hydrolysis in acidic or alkaline medium.

(n) A compound of the formula

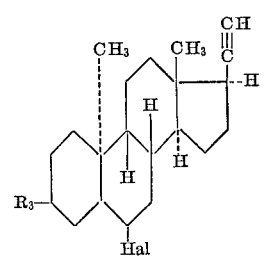

in which formula $R_3$ represents a 3-keto-4,6-bisdehydro-system, a 3-keto-1,4-bisdehydro-system, a 3-keto-1,4,6-trisdehydro-system, a 3-alkoxy-3,5-bisdehydro-system,
Hal represents a fluoro-, chloro- or bromo atom, is subjected to a reaction with the mercury compound of para toluene sulfamide.

(o) A compound of the formula

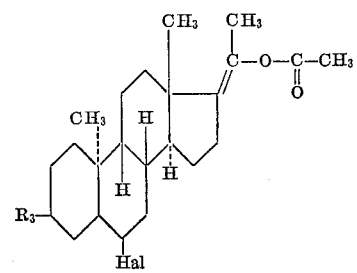

in which formula $R_3$ represents a 3-keto-4,6-bisdehydro-system, a 3-keto-1,4-bisdehydro-system, a 3-keto-1,4,6-trisdehydro-system,
Hal represents a fluoro-, chloro- or bromo atom, is subjected to an epoxidation reaction at the carbon atoms 17, 20 followed by hydrolysis or is oxidised with Os O4.

(p) A compound of the formula

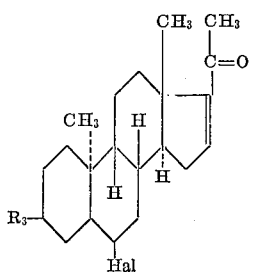

in which formula $R_3$ represents a 3-keto-4,6-bisdehydro-system, a 3-keto-1,4-bisdehydro-system, a 3-keto-1,4,6-trisdehydro-system, Hal represents a fluoro-, chloro- or bromo atom, is subjected to epoxidation in the presence of a hydrogen halide to produce the corresponding 17β-hydroxy-16-halogeno compound, followed by dehalogenation by means of catalytic reduction with Raney nickel.

(q) A compound of the formula

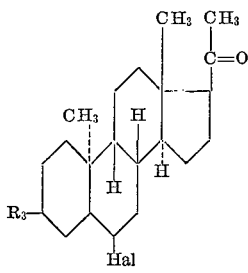

in which formula $R_3$ represents a 3-keto-4,6-bisdehydro-system, a 3-keto-1,4-bisdehydro-system, a 3-keto-1,4,6-trisdehydro-system, Hal represents a fluoro-, chloro- or bromo atom, is subjected to peroxidation with tertiary butylsodium or potassium and oxygen followed by reduction with zinc in an acidic medium.

(r) A compound of the formula

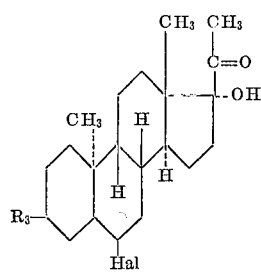

in which formula $R_3$ represents a 3-keto-4,6-bisdehydro-system, a 3-keto-1,4,6-trisdehydro-system, a 3-alkoxy-3,5-bisdehydro-system, Hal represents a fluoro-, chloro- or bromo atom, is subjected to an esterification or an etherification reaction of the hydroxy group at carbon atom 17.

(s) A compound of the formula

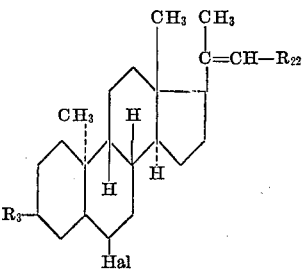

in which formula $R_3$ represents a 3-keto-4,6-bisdehydro-system, a 3-keto-1,4-bisdehydro-system, a 3-keto-1,4,6-trisdehydro-system, a 3-alkoxy-3,5-bisdehydro-system, Hal represents a fluoro-, chloro- or bromo atom, and $R_{22}$ represents an —O—Acyl group or a group

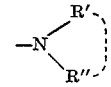

wherein R' and R'' are each an alkyl group containing 1–6 carbon atoms or form together with the nitrogen atom a pyperidyl group, is subjected to oxidation.

The methods enumerated hereabove under (a)–(s) inclusive have been described in literature in more detail. A survey thereof follows herebelow (the letters (a) to (s) refer to the corresponding paragraphs (a)–(s) as indicated herebefore).

The expression "steroid" in this survey is used to say that the known methods have been described in literature in relation to either normal steroids or to 9β,10α-steroids and to indicate that these methods can be applied to 9β,10α-steroids to prepare the compounds of the underlying invention.

Introduction of Δ¹-double bond (a) By microbiological 1-dehydrogenation, e.g., with Corynebacterium Simplex, A. Nobile, et al., J. Am. Chem. Soc. 77, 4184 (1955).

(b) By direct 1-dehydrogenation (1) with iodine pentoxide or periodic acid, Dutch patent application 215,154 and 211,626; (2) with selenium dioxide, J. H. Fried, et al., J. Am. Chem. Soc., 81, 1235 (1959), A. Bowers, et al., J. Am. Chem. Soc., 81, 5991 (1959); (3) with chloranil e.g. for the conversion of 3-keto-Δ⁴ into 3-keto-Δ¹,⁴,⁶-steroids, E. J. Agnello and G. D. Laubach, J. Am. Chem. Soc., 82, 4293 (1960); (4) with 2,3-dichloro-5,6-dicyanobenzoquinone, D. Burn, et al., Proc. Chem. Soc., 1960, 14; (5) by dehydrogenation of 3-ketosteroids with lead tetra acetate, R. L. Clarke, J. Am. Chem. Soc., 77, 661 (1955), R. Joly, Bull. Soc., 366 (1958).

(c) By selective 1,2-dehydrohalogenation of 2-halo-3-keto-steroids, e.g., with an organic base such as collidine or with lithiumbromide and lithium carbonate in dimethylformamide, C. Djerassi, J. Am. Chem. Soc., 71, 1003 (1949).

Introduction of Δ⁶-double bond (d) By direct 6-dehydrogenation of 3-keto-Δ⁴-retrosteroids; (1) with substituted benzoquinones, such as chloranil, (E. J. Agnello and G. D. Laubach, J. Am. Chem. Soc., 82, 4293, (1960) or Bowers, J. Am. Chem. Soc., 81, 5991 (1959)), 2,3-dichloro-5,6-dicyanobenzoquinone (H. J. Ringold and A. Turner, Chem. and Ind., 1962, 211); (2) with manganese dioxide (F. Sondheimer, et al., J. Am. Chem. Soc., 75, 5932 (1953)).

(e) By acidic isomerisation of 3-keto-Δ⁴,⁷-steroids in a waterfree and alkanol containing medium, e.g., with hydrochloric acid in isopropanol, which may contain methylenedichloride (P. Westerhof and E. H. Reerink, Rec. Trav. Chim., 79, 771 (1960)). (f) By reaction of a $\Delta^{3,5}$-3-enolether-steroid with 2,3-dichloro-5,6-dicyanobenzoquinone, German Patent 1,044,077.

(g) By dehydratation of a 3-keto-4-dehydo-6β-halo-7-hydroxy-steroid, (preferably the 6β-chloro compound), e.g., with hydrochloric or hydrobromic acid (K. Brückner, Chem. Ber. 94, 1255 (1961)). The starting compounds of this reaction may be prepared by reaction of a 3-keto-$\Delta^{(1),4,6}$-dehydro-steroid with a per-acid, such as monoperphthalic acid according to a method described by Brückner, Chem. Ber. 94, 1225 (1961), which reaction results in formation of the corresponding 6,7-epoxide, followed by reaction of the compound thus produced with a hydrogen halide, such as hydrogen chloride, hydrogen fluoride or hydrogen bromide (Brückner, ibidem). The corresponding 6-chloro-7-hydroxy-steroids may also be produced by reacting a 3-keto-$\Delta^{(1),4,6}$-steroid with chromylchloride.

(h) Furthermore they may be prepared by reaction of $\Delta^{3,5}$-3-enolether-6-halo-steroids with a halogen substituted benzoquinone such as 2,3-dichloro-5,6-benzoquinone, South African patent specification 6757.

(i) Oxidation of 3-enolether-$\Delta^{3,5}$-6-halo-steroids with tert. butylchromate gives 3-keto-$\Delta^{4,6}$-6-halo-steroids, K. Yasuda, Chem. Pharm. Bull. 11, 1167 (1963).

Introduction of the 3-enolether-$\Delta^{3,5}$-system (j) By enoletherification of a 3-keto-$\Delta^4$ (or a 3-keto-$\Delta^5$) steroid with an alcohol in the presence of a catalyst, e.g., with benzylalcohol in the presence of p-toluene sulphonic acid, (S. Bernstein, et al., J. Org. Chem., 18, 1166 (1953)) or with an orthoformate ester in the presence of a catalyst, e.g., with ethylorthoformate and hydrochloric acid (A. Serini, et al., Ber. 71, 1766 (1938)) or ethylorthoformate with p-toluene sulphonic acid (R. Gardi, et al., J. Org. Chem., 27, 668 (1962)) and A. D. Cross et al., Steroids 6, 198 (1963) or with a dialkoxy propane, e.g., with dimethoxypropane in methanol-dimethyl-formamide, in the presence of a catalyst such as p-toluene sulphonic acid (A. L. Nussbaum, et al., J. Org. Chem., 26, 3925 (1961)).

Introduction of 6-halogen (k) By substitution halogenation at carbon atoms 6 with N-halo imides such as bromosuccinic imide or with halogens such as bromine, (C. Djerassi, et al., J. Am. Chem. Soc. 72, 4534 (1950)). (1) By halogenation of a $\Delta^{3,5}$-3-enolether steroid with, e.g., halogens, such as chlorine, bromine, or with 30 $\Delta^4$-6-hal, (L. H. Knox, J. Am. Chem. Soc., 82, 1230 (1960)), N-halo imides, such as N-bromosuccinimide (Lit. idem.) or with perchlorylfluoride (S. Nakanishi, J. Am. Chem. Soc., 81, 5259 (1959)); (2) by halogenation of a $\Delta^{3,5}$-3-enolester steroid with, e.g., halogens, such as chlorine (H. H. Inhoffen, C.A., 53, 456 (1959)) or with N-halo imides (C. Djerassi, J. Am. Chem. Soc., 77, 3827 (1955)) or with perchlorylfluoride (B. M. Bloom, Chem.a.Ind., 1959, 1317).

Introduction of the 17β-acetyl 17α-hydroxy (or esterified or etherified hydroxy)

(m) By hydrolysis in acidic or alkaline medium of an epoxy formiate having at carbon atom 17 of the steroid molecule the group

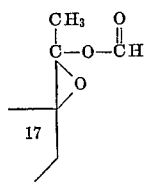

(Belg. Patent Specification 577,615).

(n) By reaction of a 17β-ethynyl steroid with a mercury compound of p-toluene sulfamide (Goldberg e.a. Helv. Chim. Acta, 26, page 680 (1943)).

(o) By reaction of a $\Delta^{17,20}$-20-acetoxy steroid with osmiumtetroxide or by epoxidising the said compound followed by hydrolysis as has been described in U.S. patent specification 2,562,030.

(p) by epoxidising a 17β-acetyl-$\Delta^{16}$-steroid in the presence of a hydrogen halide followed by dehalogenating the 16-halogeno-17β-acetyl-17α-hydroxy compound thus produced by means of catalytic reduction with Raney nickel.

(q) By peroxidation, e.g., with sodium- or potassium tertiary butyl and oxygen followed by reduction with zinc in an acidic medium.

(r) By esterification of etherification reaction of the hydroxy group of a 17α-hydroxy-20-keto-pregnane as described in Belgian patent specification 577,615.

Introduction of the 17β-acetyl group (s) This group can easily be introduced by oxidation of a 20(22)-en-22-amine or a 20(22)-enol-22-acetate as is described in Belgian patent specification 577,615.

Of the numerous methods listed hereabove some deserve emphasis due to their particular usefulness. Thus, the introduction of a double bond at carbon atoms 1 and 2, is preferably carried out with selenium dioxide or with 2,3-dichloro-5,6-dicyanobenzoquinone. The starting materials in this reaction contain a 3-keto-4-dehydro-, a 3-keto-4,6-bisdehydro-system, a fluoro-, chloro- or bromo atom at carbon atom 6, the —(β)CO—CH₃ group at carbon atom 17 and in α-position at carbon atom 17 a hydrogen atom or an esterified or an etherified hydroxy group. The products resulting from this reaction contain the corresponding groups and besides this a double bond at carbon atom 1.

According to another preferred method a double bond at carbon atom 1 is introduced by dehydrohalogenating with a lithium-bromide and lithiumcarbonate in dimethylformamide a 2-halogeno-9β,10α-steroid which contains a 3-keto-4-dehydro- or a 3-keto-4,6-bisdehydro-system and a fluoro-, chloro- or bromo atom at carbon atom 6 and a —CO—CH₃ group at carbon atom 17 in β-position and a hydrogen atom or an esterified or etherified hydroxy group at carbon atom 17 in α-position. According to this process the same products are prepared as according to the method described in the foregoing paragraph. It should be mentioned that when R₃ represents a 3-keto-4-dehydro-system and the halogen atom at carbon atom 6 is a chloride or bromine atom that the halogen atom at carbon atom 2 preferably is an iodine atom.

According to a further preferred method a 6-dehydro-bond is introduced into a 9β,10α-steroid containing a 3-keto-4-dehydro-system, a fluoro-, chloro- or bromo atom in β-position at carbon atom 6, a β—CO—CH₃ group at carbon atom 17 and in α-position at this carbon atom a hydrogen atom or an esterified or an etherified hydroxy group by direct dehydrogenation with 2,3-dichloro-5,6-dicyanobenzoquinone. The same dehydrogenation agents may also with advantage be applied to the same starting materials in which however not a 3-keto-4-dehydro but a 3-alkoxy-3,5-bisdehydro-system is present.

According to another preferred method a halogen atom at carbon atom 6 is introduced by using 3-acyloxy-3,5-bisdehydro-9β,10α-steroids as starting materials and which contain at carbon atom 17 in β-position a —CO—CH₃ group and in α-position a hydrogen atom or an esterified or an etherified hydroxy group. This preferred halogenation method is carried out with perchlorylfluoride or with a N-haloimide, such as N-bromo- or N-chlorosuccinimide or N-bromo- or N-chloro-acetamide or with molecular bromine or chlorine. The reaction results in the formation of 3-keto-4-dehydro-6-halo-9β,10α-steroids. In order to produce the compounds according to the invention an additional 1,2-dehydrogenation and/or 6,7-dehydrogenation has then still to be followed.

According to a further preferred method the introduction of a —CO—CH₃ group at carbon atom 17 is carried out by oxidising a 20(22)-en-22-amino or -22-acylate- 9β,10α-steroid with for example ozone, sodium- or potassium bichromate, chromium trioxyde or with potassium permanganate. The starting materials in this case further contain a 3-keto-4,6-bisdehydro-, a 3-keto-1,4-bisdehydro-, or a 3-keto-1,4,6-trisdehydro-system and a fluoro-, chloro- or bromo atom at carbon atom 6. These systems and substituents remain unchanged during the oxidation reaction due to which they occur also in the end products.

Finally, the preferred method for introducing a —CO.CH₃ group and an esterified or etherified hydroxy group in β and α-position respectively of the 17 carbon atom comprises hydrolysing a 9β,10α-steroid having at carbon atom 17 the configuration

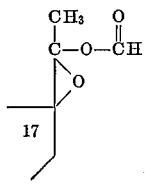

and in which starting material a 3-keto-4,6-bisdehydro-, or a 3-keto-1,4,6-trisdehydro- or a 3-keto-1,4-bisdehydro-system is present as well as a fluoro-, chloro- or bromo atom at carbon atom 6. The hydrolysis may take place in either alkaline or acidic medium. The reaction must be concluded with esterification or etherification of the 17-hydroxy group in order to produce the compounds according to the definition of the invention.

These preferred methods exalt either in a relatively high yield, or relatively high specificity, or relatively good availability of the steroid starting material or cheapness of the process as such.

EXAMPLE I 10 g. of 9β,10α-pregna-4,6-diene-3,20-dione (Rec. Trav. Chim. 79, 771 (1960)) were dissolved in a solution of 26 g. of perbenzoic acid in 565 ml. of chloroform at 0°, after which the reaction mixture was allowed to stand at the same temperature in a refrigerator. The consumption of peracid was determined by iodometrical titration, whereby the decrease of content of peracid of a blank was taken into account. After 1, 5, 20, 29 and 45 hours 18, 55, 155, 173 and 190% (i.e., gr. at 0/mol) of peracid were consumed, respectively. After a reaction time of 20, 27 and 46 hours samples of the reaction mixture worked up as described below contained according to the ultraviolet absorption spectrum 24, 18 and 16.4% of the starting material, respectively.

After 50 hours the reaction mixture was diluted with 2 l. of ether and washed (at 0°) with 4× 750 ml. of a 3% sodium carbonate solution and then wtih 3× 500 ml. of ice-water (until neutral). The solution was dried over sodium sulphate, filtered and the solvent evaporated in vacuo at a low temperature (t. 30°). The resin (9.02 g.) showed a maximum at 234 nm. with a (1%, 1 cm.)=285 and at 286 nm. with a (1%, 1 cm.)=35.

A small sample of the epoxydation product was purified chromatographically (silicage) for analytical purposes. Analytical data of 6,7-oxido-9β,10α-pregn-4-ene-3,20-dione are: Melting point: 186(s)–187–189°. ε(λmaximum=241 nm.)=14000. Found: C, 76.5, 76.8; H, 8.7, 8.8; O, 15.2, 14.9. Calc. for $C_{21}H_{28}O_3$(328.45): C, 76.79; H, 8.59; O, 14.61. The infrared absorption spectrum showed bands at 1703, 1677, 1627, 1354, 1233, 953, 881 and 808 cm.⁻¹.

The crude epoxidation product was dissolved in 400 ml. of ethanol-free chloroform. To this solution were added 280 ml. of a 6.5% solution of hydrochloric acid in acetic acid, after which the dark coloured reaction mixture was allowed to stand at room temperature for 3½ hours.

Then the reaction mixture was poured into 2 l. of ice-water and the water layer extracted once with chloroform. The combined chloroform layers were washed with 3× 500 ml. of ice-water, 3× 500 ml. of 5% sodium bicarbonate solution at 0° and finally with water until neutral After drying over sodium sulphate the solution was filtered and the solvent evaporated in vacuo. The resinous residue was treated with a small amount of cold ether by which 1.5 g. of crystals were obtained. Recrystallization from ethyl acetate at −5° yielded 0.76 g. of crystals with a melting point of 168–169–170° (dec.), a (1%, 1 cm.)=580 at 287 nm. Repeated recrystallization finally gave 0.64 g. of 6-chloro-9β,10α-pregna-4,6-diene-3,20-dione with a melting point of 169(s)–175–175.5° (dec.). The melting (decomposition) point of the substance proved to be no standard for the purity of the compound. ε(λmaximum=287.5 nm.)=21600. Found: C, 72.7; H, 7.9; Cl, 10.3. Calc. for $C_{21}H_{27}O_2Cl$(346.92): C, 72.71; H, 7.84; Cl, 10.23. The infrared absorption spectrum showed bands at 1704, 1658, 1613, 1584, 1415, 1230, 1195, 885 and 791 cm.⁻¹.

EXAMPLE II 1 g. of the crude epoxide obtained as described in Example I was dissolved in 30 ml. of chloroform, to which solution was added a mixture of 4 g. of hydrogen fluoride, 4 ml. of chloroform and 7 ml. of tetrahydrofuran.

After standing at room temperature for three days the mixture was poured out into an aqueous solution of sodium bicarbonate. The 6,7-fluorohydrin thus produced was extracted with chloroform. After washing with water, drying over sodium sulphate and filtration, the chloroform was evaporated in vacuo. The crude product was dissolved in 20 ml. of waterfree acetic acid after which 2 g. of hydrogen bromide dissolved in 6 ml. of acetic acid were added. After one hour at room temperature the reaction mixture was poured out into an aqueous sodium bicarbonate solution. After washing with water, drying over sodium sulphate and filtration the solvent was evaporated in vacuo. The residue was recrystallised from ethanol at −5°, thus producing 6-fluoro-9β,10α-pregna-4,6-diene-3,20-dione. Melting point: 177–178.5°. ε(λmaximum=285 nm.)=23600. Found: C, 76.0, 76.4; H, 8.3, 8.2; F, 6.1, 6.2. Calc. for $C_{21}H_{27}O_2F$(330.43): C, 76.32; H, 8.24; F, 5.75. Infrared absorption bands at: 1696, 1667, 1650, 1587, 1422, 1361, 1189, 896 and 876 cm.⁻¹. $[\alpha]_D^{25}=-263°$ (chloroform).

EXAMPLE III 1 g. of the crude epoxide, obtained by epoxidation of 17α-hydroxy-9β,10α-pregna-4,6-diene-3,20-dione 17-acetate (Rec. Trav. Chim. 79, 1118 (1960)) according to Example I, was converted into the 6-dehydro-6-fluoro compound as described in Example II. The residue obtained was recrystallised from ethanol at −5°, thus producing pure 6-fluoro-17α-hydroxy-9β,10α-pregna-4,6-diene-3,20-dione 17-acetate. Melting point: 182.5–184.5°. ε(λmaximum=285 nm.)=22100. Found: C, 70.8, 70.7; H, 7.7, 7.6; F, 4.2. Calc. for $C_{23}H_{29}O_4F$(388.46): C, 71.11; H, 7.52; F, 4.89. Infrared absorption bands at: 1739, 1713, 1667, 1648, 1588, 1419, 1253, 1056, 1013, 894 and 862 cm.⁻¹. $[\alpha]_D^{25}=-335$ (chloroform).

EXAMPLE IV 1 g. of the 6,7-epoxide described in Example III was treated with hydrochloric acid in a mixture of ethanol-free chloroform and acetic acid according to Example I. Workup was followed by chromatography through a column of silicagel and recrystallization from ethanol at room temperature. The crystals of the pure 6-chloro-17α-hydroxy-9β,10α-pregna-4,6-diene-3,20-dione 17-acetate melted at 150–151° (dec.). ε(λmaximum=286 nm.)=20800. $[\alpha]_D^{25}=-401°$ (chloroform). Found: C, 67.5, 67.5; H, 7.2, 7.1; Cl, 9.5, 9.6. Calc. for $C_{23}H_{29}O_4Cl$(404.92): C, 68.22; H, 7.22; Cl, 8.75. Infrared absorption bands at: 1742, 1718, 1665, 1620, 1590, 1370, 1355, 1252, 1240, 1060, 1028 and 896 cm.⁻¹.

EXAMPLE V

To a solution of 4.82 g. of 6β-chloro-17α-hydroxy-9β,10α-pregn-4-ene-3,20-dione 17-acetate in 90 ml. of dry, purified dioxan were added 4.2 ml. of ethylorthoformate and 160 mg. of p-toluenesulphonic acid. The mixture was kept in the dark at room temperature for 20 hours. Then 1 l. of petroleum ether and 1 ml. of dry pyridine were added to the reaction mixture, after which the milky solution was filtered through a column of 48 g. of silicagel. The first fraction (1 l.) contained 4.25 g. of etherified product. Elution with 0.5 l. of petroleum ether-benzene (1+1) afforded a second fraction of 0.44 g. The combined residues were recrystallised at 0° from ethanol containing 1% of pyridine, yielding 3.72 g. of 3-ethoxy-6-chloro-17α-hydroxy-9β,10α-pregna-3,5-diene-20-dione 17-acetate with a melting point of 133.5–135° and a B (1%, 1 cm.)=453 at 253 nm. On the thin-layer chromatogram only one spot could be observed. Physical constants of the analytically pure substance: Melting point: 134.5–135.5°. $[\alpha]_D^{25}=+52°$ (chloroform). $\epsilon(\lambda maximum=253$ nm.) =19600. Found: C, 69.3; H, 8.2; Cl, 8.3. Calc. for $C_{25}H_{35}O_4Cl(434.99)$: C, 69.02; H, 8.11; Cl, 8.15. Infrared absorption bands at: 1741, 1712, 1648, 1619, 1381, 1353, 1248, 1238, 1227 and 1194 cm.$^{-1}$.

The starting material had been prepared by chlorination of 3,17α-dihydroxy-9β,10α-pregna-3,5-dien-20-one 3,17-diacetate (Rec. Trav. Chim. 79, 1118 (1960)) with chlorine in ether-aqueous acetic acid in the presence of potassium acetate.

EXAMPLE VI

A solution of 4 g. of 6β-fluoro-9β,10α-pregn-4-ene-3,20-dione and 4 g. of 2,3-dicyano-5,6-dichlorobenzoquinone in 100 ml. of dry benzene, with 0.4 g. of p-nitrophenol as an accelerator, was refluxed for 7 hours. The precipitated hydroquinone was then filtered off and the benzene solution was washed, after dilution with 150 ml. of benzene, with ice-water (2× 100 ml.) and a N sodium hydroxide solution of 0° (4× 100 ml.). The washings were backwashed with benzene (100 ml.) and the combined extracts were washed with water. The solution was dried over sodium sulphate and evaporated to dryness yielding 2.0 g. of crystalline material.

Recrystallization from ethylacetate at −5° yielded 1.5 g. of 6β-fluoro-9β,10α-pregna-1,4-diene-3,20-dione with a melting point of 197–202°. Repeated recrystallization of a sample thereof raised the melting point to 208–211°.

Physical constants of an analytical sample: Melting point 208–211°. $\epsilon(\lambda maximum=242$ nm.) =16500. Found: C, 76.1, 76.0; H, 8.4, 8.4; F, 6.3. Calc. for $C_{21}H_{27}O_2F$ (330.43): C, 76.32; H, 8.24; F, 5.75. Infrared absorption bands at: 1699, 1660, 1628, 1606, 1158, 1032, 892, 819 and 697 cm.$^{-1}$.

The starting material, i.e., 6β-fluoro-9β,10α-pregn-4-ene-3,20-dione was prepared by fluorination of 3-hydroxy-9β,10α-pregna-3,5-dien-20-one 3-acetate with perchlorylfluoride in acetone-ethanol in the presence of potassium acetate. 3-hydroxy-9β,10α-pregna-3,5-dien-20-one 3-acetate was obtained by enolacetylation of 9β,10α-pregn-4-ene-3,20-dione (Rec. Trav. Chim., 79, 771 (1960)) with isopropenyl acetate in benzene in the presence of p-toluenesulphonic acid.

EXAMPLE VII

A solution of 1.75 g. of 6-fluoro-9β,10α-pregna-4,6-diene-3,20-dione and 1.5 g. of 2,3-dichloro-5,6-dicyanobenzoquinone in 48.5 ml. of dioxan was heated at reflux temperature in a nitrogen atmosphere for 20 hours. Workup was performed as described in Example VI, affording after recrystallization from acetone-hexane pure 6-fluoro-9β,10α-pregna-1,4,6-triene-3,20-dione. Melting point: 191–193°. $\epsilon(\lambda maximum=254$ nm.) =10400.

$[\alpha]_D^{25}=-101.5°$ (chloroform). $\epsilon(\lambda maximum=302$ nm.) =11550. Found: C, 77.1, 77.3; H, 7.8, 7.8; F, 6.0, 6.4. Calc. for $C_{21}H_{25}O_2F$ (328.43): C, 76.79; H, 7.67; F, 5.79. Infrared absorption bands at: 3040, 1702, 1665, 1619, 1593, 1391, 1362, 1353, 1288, 1198, 891, 868 and 815 cm.$^{-1}$.

EXAMPLE VIII 1 g. of 6,7-oxido-9β,10α-pregn-4-ene-3,20-dione (see Example I) was dissolved in 50 ml. of ethanol-free chloroform, after which 9 ml. of a 28% solution of dry hydrogen bromide in acetic acid was added. After standing at room temperature for 3½ hours, the mixture was diluted with water and extracted with a mixture of methylene chloride and petroleum ether (1+1). The combined extracts were washed with water dried and the solvents evaporated in vacuo.

The residue was recrystallised from ethanol at 0° affording the pure 6-bromo-9β,10α-pregna-4,6-diene-3,20-dione with a melting point of 107–108° (dec.). $\epsilon(\lambda maximum=292$ nm.) =19000. Found: C, 64.0, 64.2; H, 7.0, 7.0; Br, 20.9, 20.8. Calc. for $C_{21}H_{27}O_2Br(391.34)$: C, 64.45; H, 6.95; Br, 20.42. Infrared absorption bands at: 1708, 1675, 1613, 1589, 1420, 1355, 1267, 1232 and 882 cm.$^{-1}$ (measured in carbontetrachloride).

EXAMPLE IX 2 g. of 6-chloro-9β,10α-pregna-4,6-diene-3,20-dione were dissolved in chloroform, which solution was mixed homogeneously with 194 g. of lactose. The mixture was dried at 40° C. during 1 hour. The mixture was wettened with a 10%-ic. aqueous solution of 2 g. of gelatine and subsequently ground through a 20 mesh sieve. The mixture was dried at 40° C. during 24 hours, whereupon the granules were ground through a 20 mesh sieve. The mixture was weighed and then had added to it proportional amounts of talcum venetum and magnesium stearate in amounts of optimal 25 mg. and 2 mg. respectively. The resulting mixture was homogenised and worked to tablets of 225 mg. each.

EXAMPLE X 5 g. of 6-fluoro-9β,10α-pregna-4,6-diene-3,20-dione was dissolved in chloroform and the solution hogomeneously mixed with 185 g. of lactose. The mixture was dried at 40° C. during 1 hour. The mixture was wettened with a 10%-ic. aqueous solution of 1.5 g. of gelatine and then ground through a 20 mesh sieve. The mixture was dried at 45° during 24 hours and again ground through a 20 mesh sieve. The granules were weighed. Subsequently, proportional amounts of potato starch, talcum venetum and magnesium stearate in amounts of optimal 33.5, 8 and 2 g. respectively. The resulting mixture was homogenised and worked up to tablets of 235 mg. each.

EXAMPLE XI

Injection liquids of 6-fluoro-17α-hydroxy-9β,10α-pregna-4,6-diene-3,20-dione 17-acetate (active ingredient) were made as follows.

5.00 g. of the active ingredient were dissolved in 90 mls. of a solution of 2% w./v. benzylalcohol and 46% w./v. benzylbenzoate in ricinic oil at a temperature of 60° C. The solution was cooled to room temperature and replenished to 100 ml. with the ricinic oil solution aforesaid. The mixture was homogenised by stirring and filtrated. Ampouls and vials were filled with the filtrated solution, subsequently sealed and then sterilised by heating for one hour at 120°.

EXAMPLE XII 5.00 g. of 6-fluoro-17α-hydroxy-9β,10α-pregna-4,6-diene-3,20-dione 17-acetate was dissolved in dimethylformamide. This solution was filtrated through a bacterial retentive filter and the sterile filtrate was poured out into sterile distilled water. Microcristallyne particles of the said steroid of a particle size of 1–10/μ originated. The crystals were filtered off and dried in vacuo over $P_2O_5$. All manipulations took place under aseptic conditions.

5 g. of the sterile microcrystalline crystals of the said steroid were suspended under aseptic conditions in 200 ml. of a sterile aqueous solution of the following composition:

| | |
|---|---:|
| Polysorbate, 80 U.S.P. _____mg__ | 200 |
| Sodiumchloride _____mg__ | 1800 |
| Methylester of p-hydroxy-benzoic acid _____mg__ | 320 |
| Propylester of p-hydroxy-benzoic acid _____mg__ | 80 |
| Sterile distilled water ad _____ml__ | 200 |

Under aseptic conditions sterile ampouls and vials were filled with this sterile suspension after careful homogenisation of the same.

EXAMPLE XIII

A solution of 500 mg. 6β-chloro-9β,10α-pregn-4-ene-3, 20-dione obtained by converting 9β,10α-pragn-4-ene-3,20-dione with isopropenylacetate into 9β,10α-pregna-3,5-dien-3-ol-20-one 3-acetate followed by chlorination of the thus produced compound with a solution of chlorine gas, and 500 mg. 2,3-dichloro-5,6-dicyanobenzoquinone in 30 ml. of benzene is heated to reflux for 10 hours.

The mixture is diluted with 50 ml. of benzene and extracted three times with 30 ml. of 2 N sodium hydroxide solution. The benzene solution was washed neutral with water, dried with sodium sulfate and concentrated in vacuo.

The residue was chromatographed on 12 g. aluminium oxide (activity III). The fractions eluted with benzene-petroleum ether (2:1) were combined and recrystallized from ethyl acetate. The 6β-chloro-9β,10α-pregna-1,4-diene-3,20-dione melts at 172–173° (dec.). λmax. 241 mμ/ε=16,450. $C_{21}H_{27}O_2Cl$. Found: C. 72.91; H, 7.82; Cl, 10.06%. Calc.: C, 72.70; H, 7.84; Cl, 10.22.

The infrared absorption spectrum showed bands at 1690, 1655, 1620, 1455, 1440, 1282, 1190, 1100, 935, 890, 812, 780 cm.$^{-1}$.

This compound is not estrogenic, is strongly progestational and is not androgenic.

EXAMPLE XIV

A solution of 1.04 g. 6-chloro-9β,10α-pregna-4,6-diene-3,20-dione and 0.95 g. 2,3-dichloro-5,6-dicyanobenzoquinone in 50 ml. of dry benzene was heated to reflux for 10 hours.

The reaction mixture was diluted with 70 ml. of benzene and extracted three times with 50 ml. of 2 N sodiumhydroxide solution. The benzene layer was washed with water to neutral, dried with sodium sulfate and evaporated to dryness.

The residue (0,7 g.) was chromatographed on 20 g. of aluminium oxide (activity II). The fractions eluted with benzene-petroleum ether were combined and recrystallized from acetone. The 6-chloro-9β,10α-pregna-1,4,6-triene-3,20-dione melted at 208–209° with decomposition. λmax. 229 mμ,ε=11,500. 253 mμ,ε=10,520. 302 mμ, ε=10,650. $C_{21}H_{25}O_2Cl$. Found: C, 73.47; H, 7.59; Cl, 10.29. Calc.: C, 73.18; H, 7.30; Cl, 10.28.

Infrared absorption bands at: 1690, 1650, 1600, 1580, 1460, 1340, 1275, 923, 890, 809 cm.$^{-1}$.

This compound is not estrogenic, not antiestrogenic, strongly progestational and not androgenic.

What is claimed is:

1. A 9β, 10α-steroid of the pregnane series selected from the group consisting of the compounds of the formulae

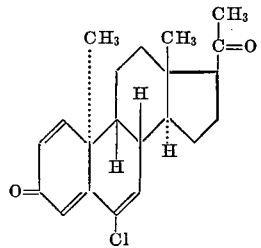

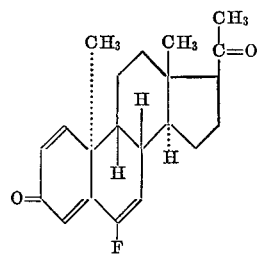

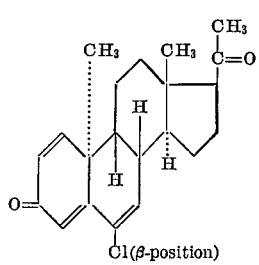

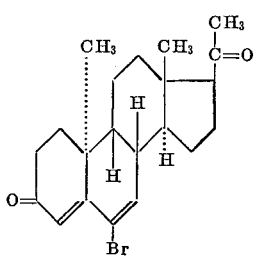

and

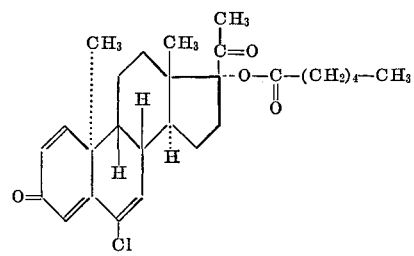

2. A compound of claim 1 of the formula:

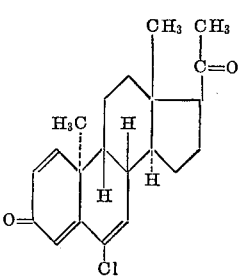

3. A compound of claim 1 of the formula:
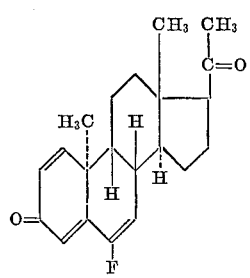
4. A compound of claim 1 of the formula:
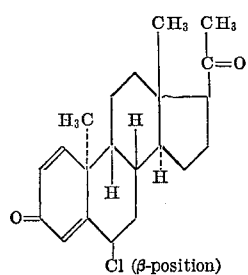
Cl (β-position)
5. A compound of claim 1 of the formula:
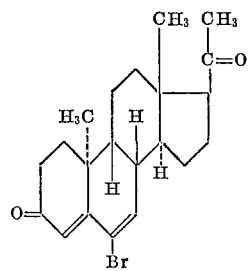
6. A compound of claim 1 of the formula
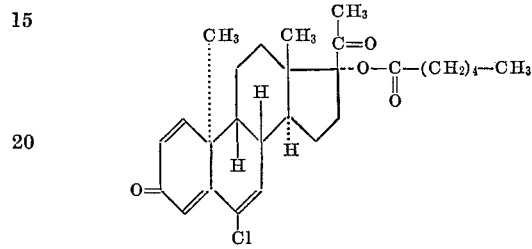
References Cited
UNITED STATES PATENTS
3,101,355  8/1963  Bowers _____ 260—397.4
3,239,540  3/1966  Campbell et al. _____ 260—397.3
ELBERT L. ROBERTS, *Primary Examiner.*

UNITED STATES PATENT OFFICE
CERTIFICATE OF CORRECTION

Patent No. 3,422,122          Dated January 14, 1969

Inventor(s) ENGBERT HARMEN REERINK ET AL

It is certified that error appears in the above-identified patent and that said Letters Patent are hereby corrected as shown below:

Column 1, line 55, "paraenterally" should read -- parenterally --.
Column 7, line 2, change "oxidation with tertiary butylchromate" to -- a reaction with a halogen substituted benzoquinone --.
Column 11, line 6, "1255" should read -- 1225 --.

Signed and sealed this 18th day of November 1969.

SIGNED AND
SEALED
NOV 18 1969

(SEAL)
Attest:

Edward M. Fletcher, Jr.
Attesting Officer

WILLIAM E. SCHUYLER, JR.
Commissioner of Patents